I. H. MURDICK.
LAWN MOWER.
APPLICATION FILED MAR. 31, 1914.
1,122,984.
Patented Dec. 29, 1914.
2 SHEETS—SHEET 2.
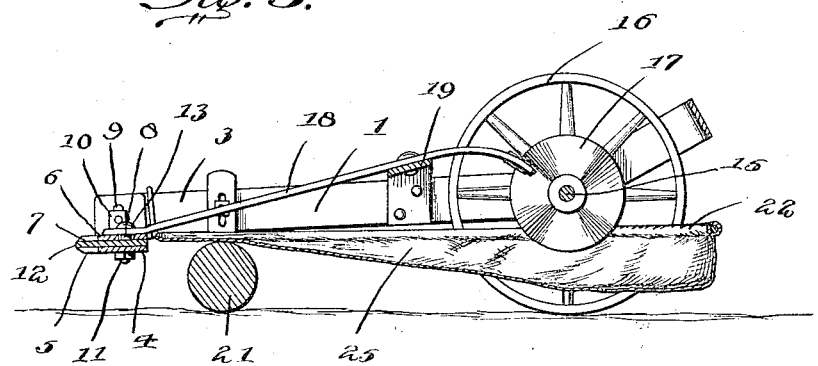
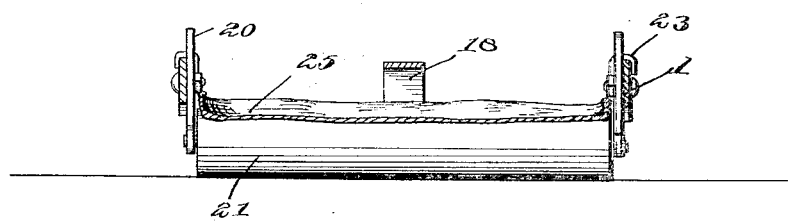
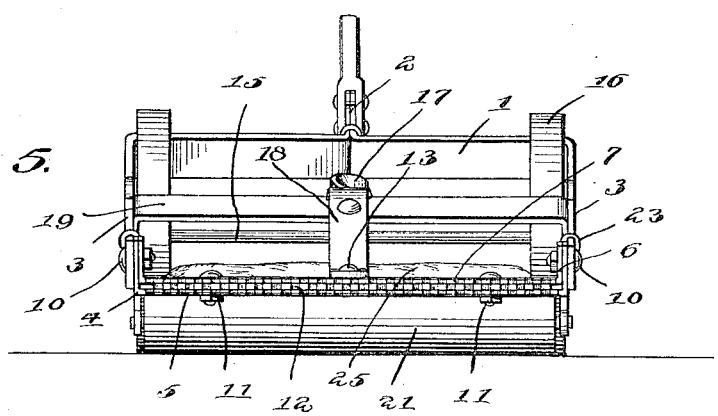
Inventor
Israel H. Murdick.
Witnesses
Frederick L. Fre,
[signature]
By Victor J. Evans.
Attorney

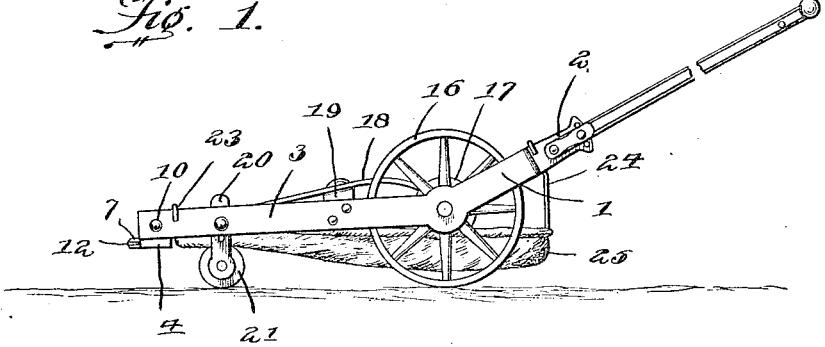
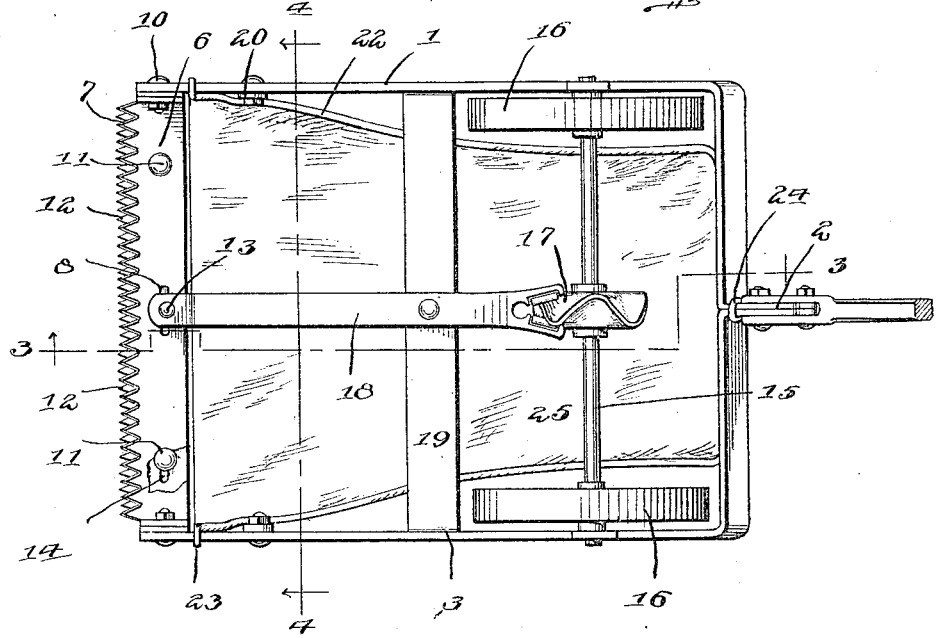

UNITED STATES PATENT OFFICE.

ISRAEL H. MURDICK, OF BENTON HARBOR, MICHIGAN.

LAWN-MOWER.

1,122,984.

Specification of Letters Patent.

Patented Dec. 29, 1914.

Application filed March 31, 1914. Serial No. 828,593.

*To all whom it may concern:*

Be it known that I, ISRAEL H. MURDICK, a citizen of the United States, residing at Benton Harbor, in the county of Berrien and State of Michigan, have invented new and useful Improvements in Lawn-Mowers, of which the following is a specification.

This invention relates to lawn mowers and more particularly to that type requiring a reciprocating cutter bar.

One of the principal objects of the invention is to provide an efficient arrangement of cutter bar elements which permits their adjustment so that their proper coactive relation may be obtained.

Another object of the invention is the provision of a one-piece frame bent up in such manner as to produce an operating handle.

Further objects of the invention will appear as the following description is read in connection with the accompanying drawing, which forms a part of this application, and in which:—

Figure 1 is a side elevation. Fig. 2 is a top plan view. Fig. 3 is a longitudinal sectional view on the line 3—3 of Fig. 2. Fig. 4 is a transverse section on the line 4—4 of Fig. 2. Fig. 5 is a front elevation.

Referring more particularly to the drawing, 1 represents the frame of the device which in this instance is substantially U-shaped and is constructed of a single piece of material having a portion extended to form a handle 2. The opposite legs of the frame extend forwardly of what may be termed the yoke portion 3 in parallel planes and are connected together at their forward ends by a brace bar 4 which is serrated or toothed, as shown at 5, and forms one element of the cutter bar. Secured in between the ends of the legs of the frame immediately over the bar 4 is a U-shaped bar 6 having teeth 7 corresponding with the teeth 5 of the bar 4 and being centrally and longitudinally slotted, as shown at 8. The upturned ends or legs of the bar 6 are slotted, as shown at 9, and passing through these slots are clamping bolts 10 which permit of the adjustment of the bar 6 toward and away from the bar 4. Additional bolts 11 extend through apertures in the bars 4 and 6 so as to maintain the adjustment obtained by the clamping bolts 10. Slidably mounted between the two bars is the toothed knife bar 12 which is provided with a vertical stud 13 projecting through the slot 8 in the bar 6. The knife bar 12 is slotted, as shown at 14, to receive the bolts 11 which guide the bar and maintain its cutting edge in proper correlative position with the teeth of the bars 4 and 6. Journaled in the legs of the frame is the driving axle 15 which has keyed thereto the tractor wheels 16 and the wheel 17 having a waved or alternating cam periphery. This waved wheel is adapted to actuate the operating lever 18 which is pivoted upon a cross bar 19 riveted to the legs of the frame and is engaged at its forward end with the stud 13. The rear end of the lever 18 is bifurcated so as to straddle the waved wheel 17, and is provided with anti-friction rollers on either side of the bifurcation so as to minimize the friction on the wheel 17. Adjustably mounted upon each leg of the frame between the cutter bar and the bar 19 are brackets 20 which support the roller 21 whose adjustment determines the cut of the grass. The grass catcher shown is constructed of a U-shaped frame 22, the terminals of the legs of which are formed with hooks 23 which removably engage over the ends of the frame. The rear end of the frame is supported by a hooked link 24 which engages over the handle 2 and the entire frame is covered with canvas or other suitable fabric 25.

What is claimed is:—

1. A lawn mower comprising a U-shaped frame, a toothed cutter bar element rigidly connecting the terminals of the legs of the frame, a toothed cutter bar element adjustable toward and away from the first toothed cutter bar element, a knife bar slidably mounted between the first and second cutter bars and means for actuating the knife bars.

2. In a lawn mower, a U-shaped frame, a toothed cutter bar element connecting the terminals of the legs of the frame, a second toothed cutter bar element arranged above the first toothed bar element, bolts passing through both of said elements and through the legs of the frame, said bolts arranged to rigidly hold the first toothed bar element in rigid position and to clamp the second toothed bar element in adjusted position, bolts passing transversely through said cutter bar elements, a toothed knife bar slidably mounted between the first and second cutter bar elements and having slots to receive the last-named bolts, said second cutter bar element being provided with a longitudinal slot, a stud on the knife bar projecting through said slot and means engaged with the stud for operating the knife bar.

In testimony whereof I affix my signature in presence of two witnesses.

ISRAEL H. MURDICK.

Witnesses:
 OLIVE M. LUCKER,
 EDITH M. HAWLEY.

Copies of this patent may be obtained for five cents each, by addressing the "Commissioner of Patents, Washington, D. C."